United States Patent [19]

Tsurube

[11] Patent Number: 5,136,378
[45] Date of Patent: Aug. 4, 1992

[54] MOVING PICTURE CODING APPARATUS

[75] Inventor: Tomoyuki Tsurube, Tokyo, Japan

[73] Assignee: Matsushita Electric Industrial Co., Ltd., Osaka, Japan

[21] Appl. No.: 745,358

[22] Filed: Aug. 15, 1991

[30] Foreign Application Priority Data

Sep. 7, 1990 [JP] Japan .................................. 2-237504

[51] Int. Cl.$^5$ ............................................ H04N 7/137
[52] U.S. Cl. ...................................... 358/136; 375/27; 375/122
[58] Field of Search .................... 358/136; 375/122, 27

[56] References Cited

U.S. PATENT DOCUMENTS 5,043,808  8/1991  Knauer ................................ 358/136
5,063,444  11/1991  Knauer ............................... 358/136

Primary Examiner—Howard W. Britton
Attorney, Agent, or Firm—Stevens, Davis, Miller & Mosher

[57] ABSTRACT

A moving picture coding apparatus is disclosed in which when an input image and the image of the preceding image are correlated to each other, the interframe coding is effected, while when no correlation exists, the intra-frame coding is carried out for packet switched networks. The moving picture coding apparatus is comprised of a device for refreshing blocks in a frame at regular intervals of time, and when the number of cells generated by coding during a predetermined past time is larger than a threshold level set in advance, the number of blocks refreshed is reduced, thereby preventing the image information more than a maximum transmission capacity of the packet switched networks from being generated.

4 Claims, 5 Drawing Sheets

☐ ··· BLOCK UNDER REFRESHMENT
▨ ··· DEGRADED BLOCK
⌐ ¬ ··· BLOCK RESTORED FROM DEGRADATION

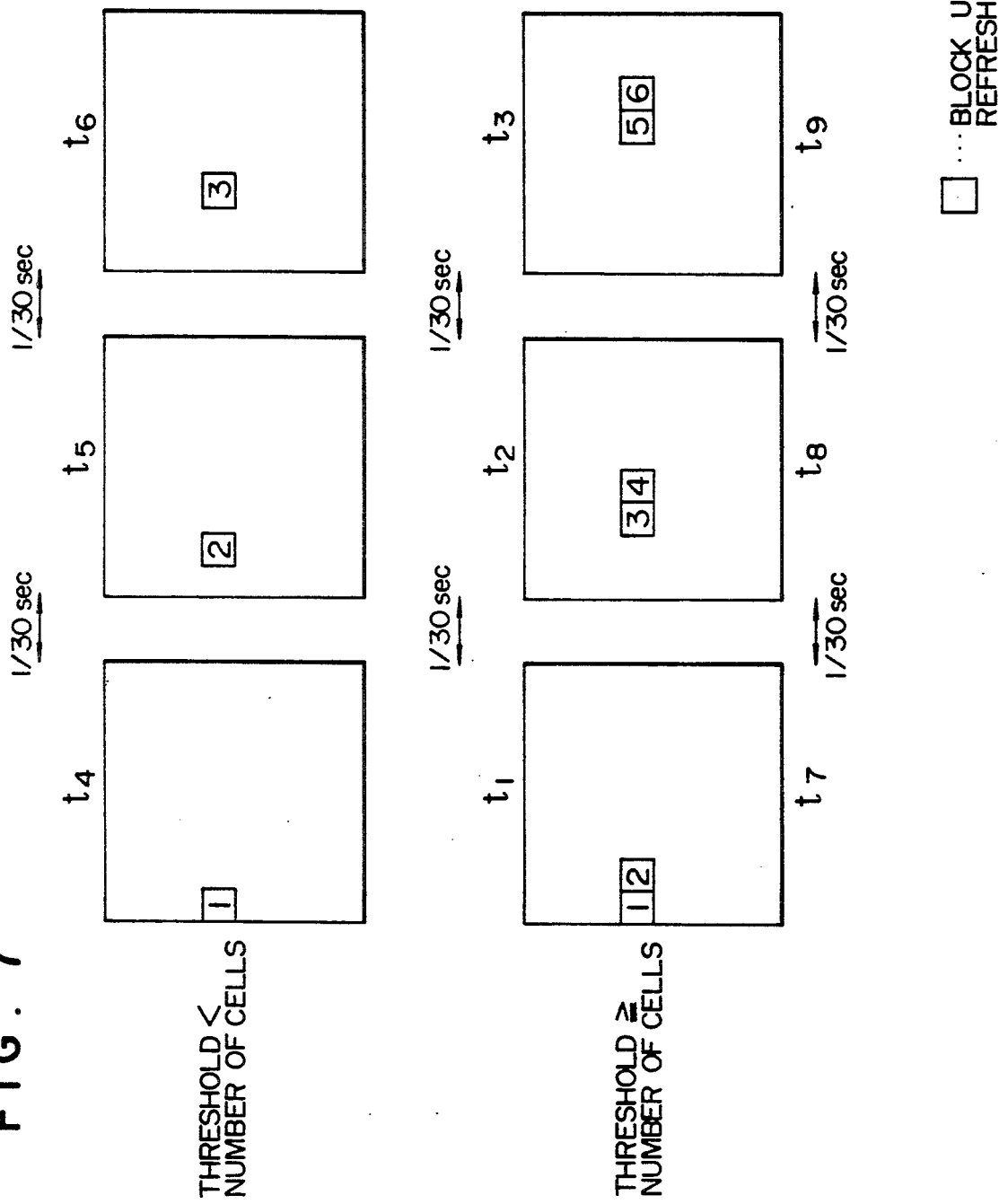

MOVING PICTURE CODING APPARATUS

BACKGROUND OF THE INVENTION

1. Field of the Invention

The present invention relates to a moving picture coding apparatus applied to television or the like for transmitting a high-quality image.

2. Description of the Related Art

In conventional moving picture coding apparatuses for transmitting moving picture information at a variable bit rate by inter-frame or intra-frame coding, a coded image data (signal) is stored in a buffer for cellulation divided into fixed-length packets, and when cells are formed, is outputted to a channel as a networks data.

An example of the conventional moving picture coding apparatuses is shown in FIG. 1.

In FIG. 1, reference numeral 1 designates an input image frame memory for storing an image, and numeral 2 an operator for computing, for each block, the difference between the image read out of the input image frame memory 1 and the reference image for inter-frame coding read out of the reference image frame memory 5 or "0". Numeral 3 designates a quantizer for quantizing the predictive error, which is the result of operation by the operator 2. Numeral 4 designates an operator for adding the result of quantization by the quantizer 3 and the image stored in the frame memory 5 or "0" to store a new image for next predict in the frame memory 5. Numeral 6 designates a refresh control circuit for deciding whether or not a forcible intra-frame coding (refreshing) should be effected in order to suppress the image degradation against the present position of a coding block supplied by a coding position information line W3, and if refreshing is required, effecting the intraframe coding or, otherwise, controlling a switch 11 through a refresh control line W2 in order to effect the inter-frame coding. Numeral 7 designates an inter/intra coding decision circuit for deciding for each block whether the image in the input image frame memory 1 and the reference image in the frame memory 5 are correlated to each other, and if correlated, effecting the inter-frame coding with motion compensation as mentioning later or otherwise effecting intra-frame coding by selecting switch 11. Numeral 8 designates a motion detection circuit for deciding whether each block of an input image stored in the input image frame memory 1 is a static or dynamic area against the block of the corresponding position of a reference image stored in the frame memory 5. If motion is detected, motion compensation is accomplished so as to minimize the predictive error. Numeral 9 designates a variable-length coding circuit for preparing a variable-length coded data in response to an output from the quantizer 3 and the motion information from the motion detection circuit 8. Numeral 10 designates a packet preparation buffer for preparing packets by packetizing into a predetermined length from the variable-length coded data prepared at the variable-length coding circuit 9. Numeral 11 designates a selecting switch for selecting the inter-frame or intra-frame coding on the basis of the decision of the refresh control circuit 6 and the inter/intra coding decision circuit 7.

According to the above-mentioned conventional moving picture coding apparatuses for transmitting an image data in variable bit rate, cell loss occurred when congestion occurred on the packet switched networks side, therefore the decoded image is degraded at a decoder. In such a case, once information is lost by the cell loss, degradation is promoted along time axis. In similar fashion, upon occurrence of a channel error in the transmission path, the difference in the interframe coding data between transmitting and receiving ends makes it impossible to decode an image correctly at the receiving end. Also, a channel error hinders from the correct reproduction of an image during long subsequent periods. In order to solve these problems, the conventional apparatuses are so constructed as to reduce the degradation along time axis by refreshing which is a forcible intra-frame coding at regular intervals of time.

An example of refreshing operation is shown in FIG. 2. The refresh control circuit 6 switches the operation of the switch 11 to refresh a predetermined amount (two in the case of FIG. 2) of blocks sequentially at intervals of 1/30 seconds. Since the block 3 which has been degraded by cell loss is refreshed at a time point $t_2$, the degradation is suppressed at a time point $t_3$.

The problem of the above-described conventional moving picture coding apparatus, however, is that since a predetermined amount of blocks is subjected to a continued intra-frame coding by refreshing with a great amount of information generated, when cell loss occurred, then, there is a case inter-frame coding information is lost, thereby conspicuously degrade the image quality.

SUMMARY OF THE INVENTION

The object of the present invention is to solve these prior art problems and to provide a superior moving picture coding apparatus for regulating the amount of refreshed blocks and thus limiting the amount of information generation not to occur congestion on the packet switched networks thereby to suppress the degradation of image quality.

In order to achieve the above-mentioned object, according to the present invention, there is provided a moving picture coding apparatus comprising means for subjecting an input image to inter-frame or intra-frame coding, means for refreshing blocks in each frame at regular intervals of time, means for generating cells by dividing a code into a predetermined length, means for comparing the amount of cells by coding during a predetermined length of past time with a threshold level set in advance, and means for reducing the amount of blocks for forcible intra-frame coding when the amount of cells is more than the threshold level.

According to the present invention with the above-mentioned configuration, in the case where the amount of cells due to the image coding during a predetermined past time exceeds a threshold level, the coding operation is performed in such a manner as to reduce the amount of block for refreshing, thereby limiting the amount of information generation in such a manner as to prevent congestion on packet switched networks.

BRIEF DESCRIPTION OF THE DRAWINGS

FIG. 7 is a diagram for explaining the refreshing operation used for describing the operation of the embodiment of FIG. 3.

DESCRIPTION OF THE PREFERRED EMBODIMENT

Figure 3:
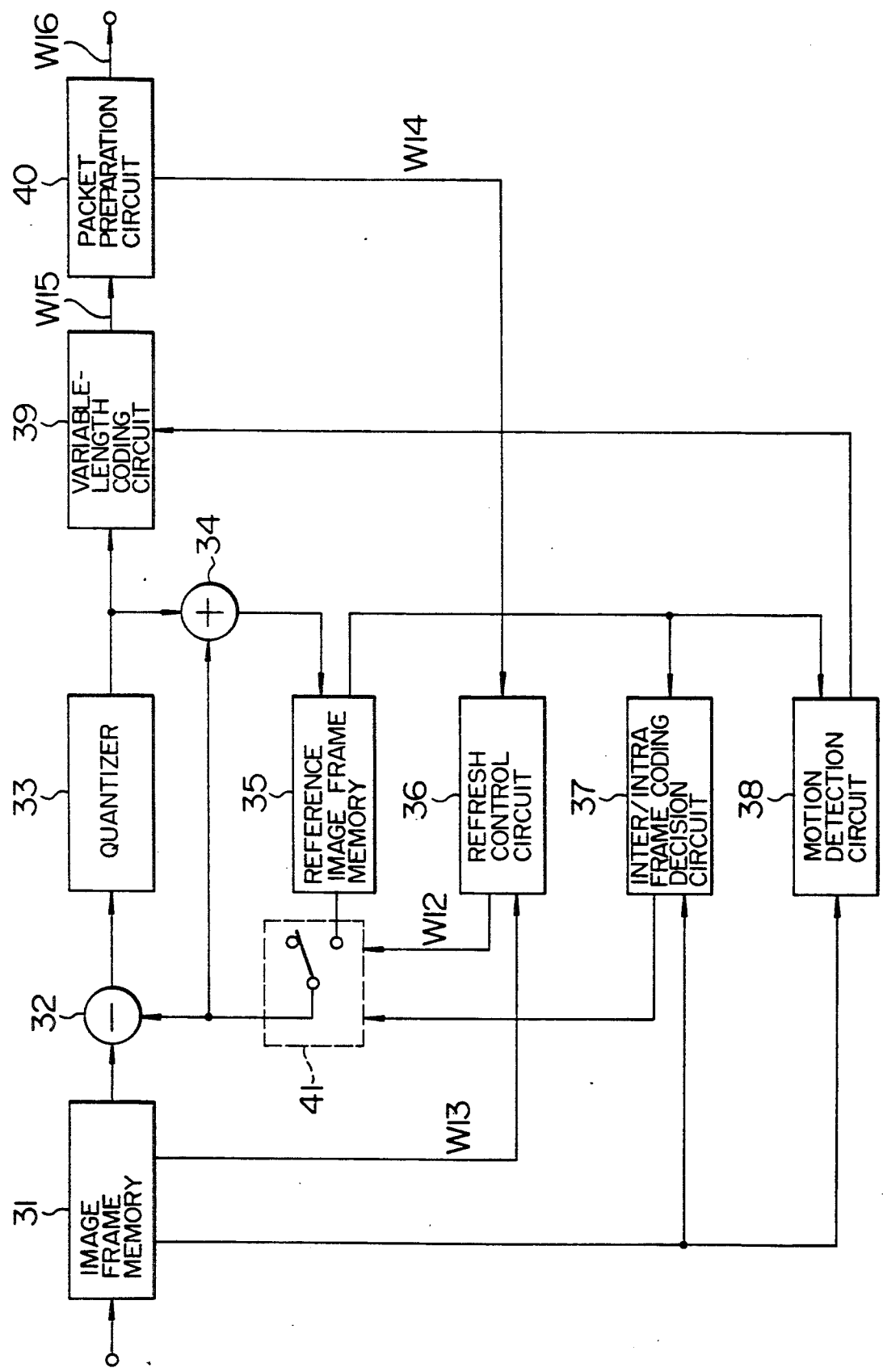
FIG. 3 is a block diagram showing a configuration of a moving picture coding apparatus according to an embodiment of the present invention.

The configuration of an embodiment of the present invention is shown in FIG. 3;

In FIG. 3, reference numeral 31 designates an image frame memory for storing images for coding. Numeral 32 designates an operator for calculating predictive error, numeral 33 a quantizer for quantizing the predictive error from the operator 32, and numeral 36 a refresh control circuit for deciding whether or not the forcible intra-frame coding (refreshing) should be effected to suppress the image quality degradation at the present coding position.

Figure 1:
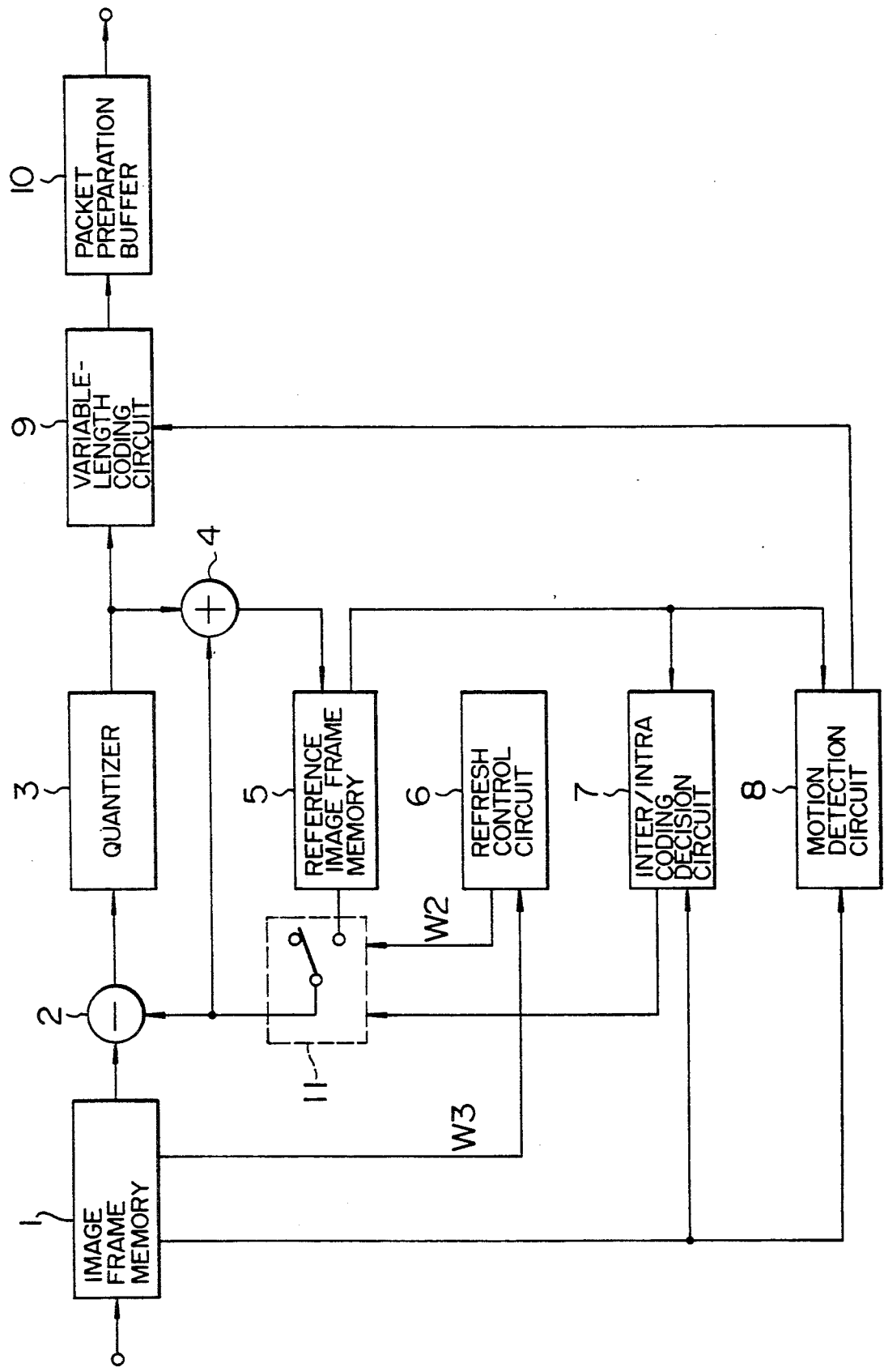
FIG. 1 is a block diagram showing a configuration of a conventional moving picture coding apparatus.
Figure 2:
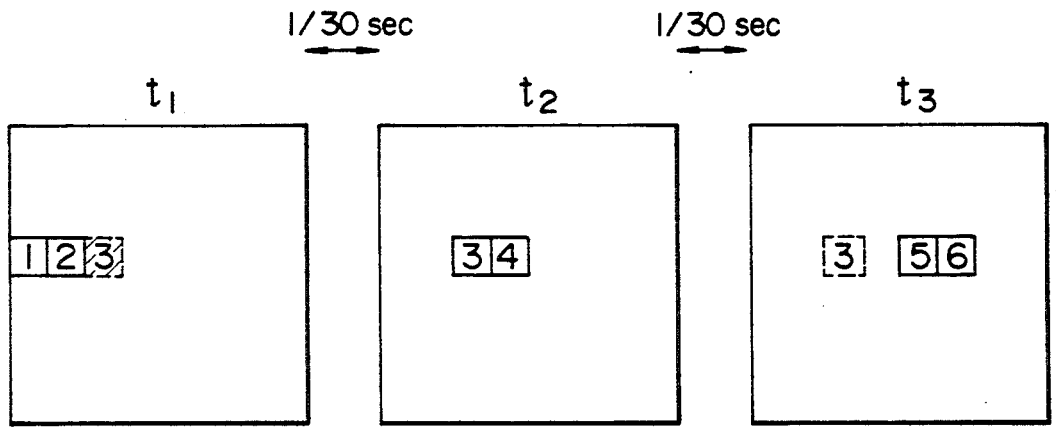
FIG. 2 is a diagram for explaining the refreshing operation used for describing the operation of the conventional apparatus shown in FIG. 1.
Figure 4:
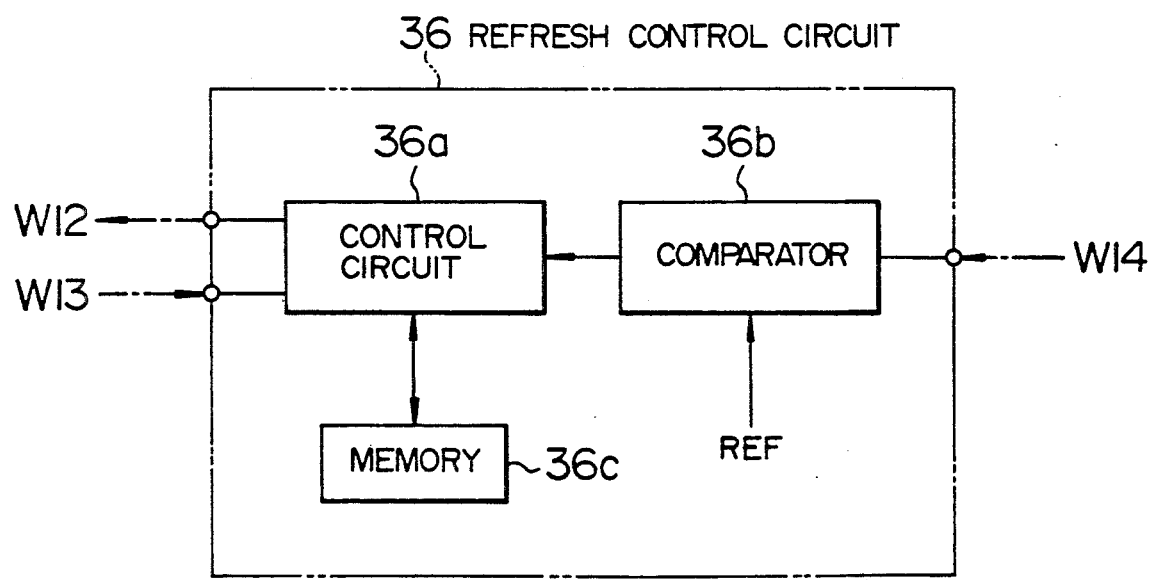
FIG. 4 is a block diagram showing a detailed configuration of a refresh control circuit according to the embodiment of FIG. 3.

A detailed configuration of the refresh control circuit 36 is shown in FIG. 4. This refresh control circuit 36 includes a control circuit 36a for deciding whether the present coded blocks should be refreshed or not, a comparator 36b for comparing the number of cells described later with a threshold level set in advance, and a memory 36c for storing the block position for refreshing a new present coded frame.

Returning to FIG. 3, numeral 37 designates an inter-/intra-frame coding decision circuit for deciding for each block whether or not an input image is correlated with the reference image from the preceding frame in reference image frame memory 35. Numeral 38 designates a motion detection circuit for deciding whether each block of input image is a static or dynamic area. If motion is detected, motion compensation is achieved so as to minimize predictive error. Numeral 39 designates a variable-length coding circuit for preparing a variable-length coded data, and numeral 40 a packet preparation circuit for dividing a coded data into coded data cells of a predetermined length and preparing a packet while sending out a cell data.

Figure 5:
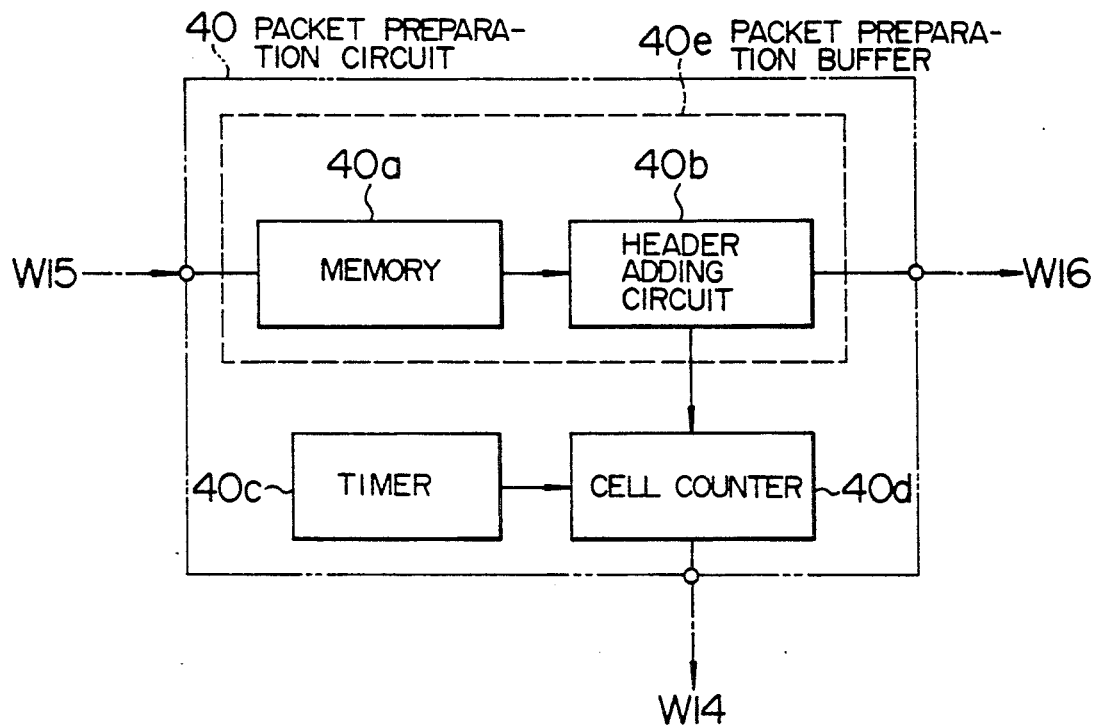
FIG. 5 is a block diagram showing a detailed configuration of a packet-preparation buffer in the embodiment of FIG. 3.

A detailed configuration of the packet preparation circuit 40 is shown in FIG. 5. The feature of this packet preparation circuit 40 lies in that it includes a packet-preparing buffer 40e having a memory 40a for storing an image data and a header-adding circuit 40b for processing a header of the data, a timer 40c for counting the time, and a cell counter 40d for counting the amount of cells during a predetermined past time. Numeral 41 designates a switch for selecting the output of the frame memory 35 or "0" in response to control signals from the refresh control circuit 36 and the inter/intra-frame coding decision circuit 37.

Now, the operation of this embodiment will be explained.

In FIG. 3, an input image is stored in the input image frame memory 31. The difference between the image read out of the input image frame memory 31 and the image of the preceding frame, that is, a reference image for inter-frame coding from reference image frame memory 35 or "0", is computed for each block at the operator 32. The reference image from the frame memory 35 or "0" is selectively switched by the switch 41, so that a reproduced image from the frame memory 35 is selected for inter-frame coding as predictive frame, and "0" for intra-frame coding. The selection control of the switch 41 is effected by a refresh control circuit 36 and a inter/intra frame coding decision circuit 37.

The result of computation at the operator 32 that is motion compensated predictive error is quantized at the quantizer 33 and is supplied to a variable-length coding circuit 39. Further, the operator 34 adds the result of quantization at the quantizer 33 and the reference image for next prediction stored in the frame memory 35. The refresh control circuit 36 decides whether or not the forcible intra-frame coding (refreshing) is to be effected in order to suppress the image quality degradation by a coding position information line W13 for transmitting the present coding position and a cell quantity information line W14. In the case where the refreshing is to be effected, the intra-frame coding is effected, while the refreshing is not to be effected, the inter-frame coding is carried out as selected by the switch 41 controlled through the refresh control line W12.

The refresh control circuit 36 includes a comparator 36b for comparing the amount of cells generated during a predetermined past time supplied by the cell quantity information line W14 from the packet preparation circuit 40 with a threshold level "ref" set in advance. If the amount of cells is larger than the threshold level "ref", the control circuit 36a is set in such a manner as to reduce the amount of blocks per frame to be refreshed below the amount of cells smaller than the threshold level "ref". Further, the control circuit 36a decides whether or not the present coded block is to be refreshed by the use of the position information of the present coded block from the coding position information line W13 and the block position information refreshed at the preceding frame stored in the memory 36c, and controls the switch 41 from the refresh control line W12 while storing the refreshed block position of a new present coded frame at the same time.

The inter/intra-frame coding decision circuit 37 decides for each block whether the input image in the image frame memory 31 and the reference image stored in the reference image frame memory 35 are correlated to each other, and if they are correlated, effects the inter-frame coding with motion compensation mentioning later, while they are not correlated carries out the intra-frame coding, as selectively controlled by the switch 41.

Also, the motion detection circuit 38 decides for each block whether each block of the image stored in the input image frame memory 31 is a static or dynamic area against the block at the corresponding position of the reference image stored in the frame memory 35, and supplies the motion information to the variable-length coding circuit 39. The variable-length coding circuit 39 prepares a variable-length coding data in response to an output from the quantizer 33 and the motion information from the motion detection circuit 38.

The packet preparation circuit 40 divides into coded data cells of predetermined length the variable-length coded data transmitted along the variable-length coded data information line W15, and prepares packets while sending out the cell data to the cell transmission line W16.

In the packet preparation circuit 40 shown in FIG. 5, the image data on the variable-length coded data information line W15 are stored in the memory 40a, and when a coded data of predetermined length is stored, and the data is sent out to the header adding circuit 40b. After header addition, the data thus converted into cells is produced on the cell transmission line W16. At the same time, the cell counter 40d counts the amount of cells packetized during a predetermined past time as determined by the timer 40c, thus producing the amount of cells on the cell quantity information line W14.

Figure 6:
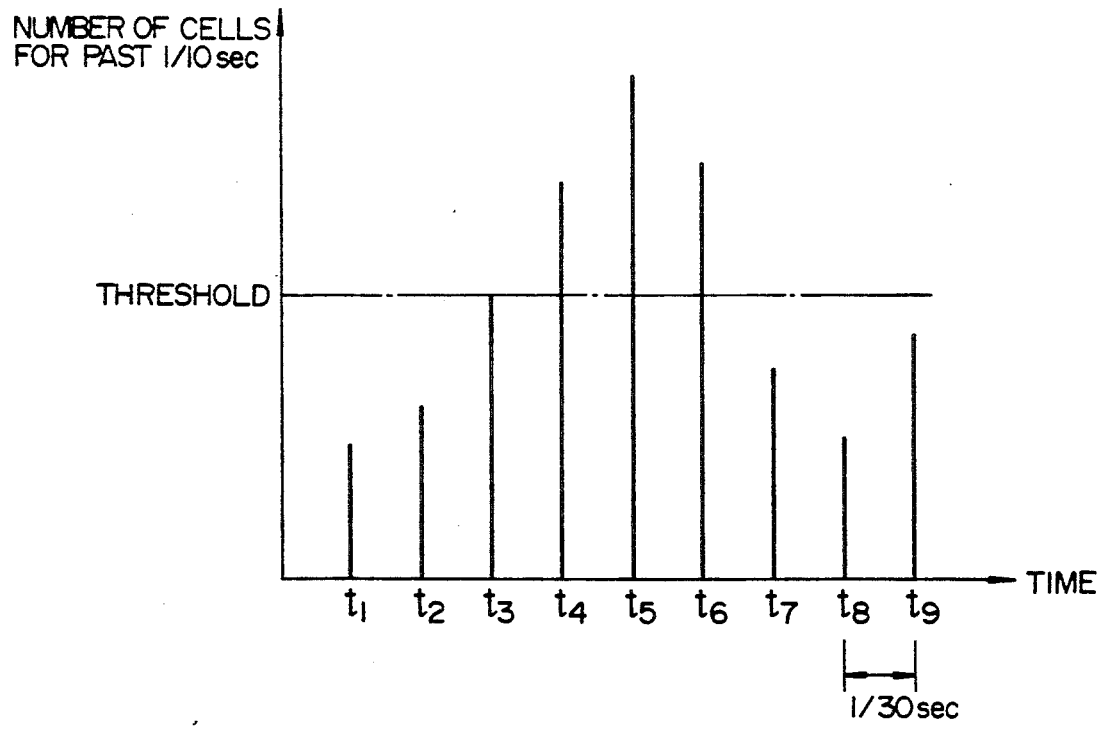
FIG. 6 is a diagram for explaining the refreshing control used for describing the operation of the embodiment of FIG. 3.

This cell quantity information is applied to the comparator 36b of the refresh control circuit 36 as shown in FIG. 4. Now, assume that as shown in FIG. 6 the amount of cells generated by coding during the past 1/10 seconds is equal to or smaller than the threshold level set at the comparator 36b during the 1/30-second time intervals of $t_1$ to $t_3$ and $t_7$ to $t_9$, and exceeds the threshold level set at the comparator 36b at the time points $t_4$, $t_5$ and $t_6$. During the time from $t_1$ to $t_3$ and $t_7$ to $t_9$, the amount of cells generated by coding during the past 1/10 seconds is equal to or smaller than the threshold level, and therefore the amount of blocks refreshed is achieved at a predetermined number. During the time period from $t_4$ to $t_6$ when the amount of cells generated by coding during the past 1/10 seconds is larger than the threshold level, on the other hand, the amount of blocks refreshed is reduced below a predetermined number in the manner shown in FIG. 7. As shown in FIG. 7, the amount of blocks refreshed at the time points $t_4$, $t_5$ and $t_6$ (one in the case of FIG. 7) is smaller than that refreshed during the time period from $t_7$ to $t_9$ (two in the case of FIG. 7).

In this way, when the amount of cells generated by coding during a predetermined past time is more than a threshold level, the amount of blocks subjected to periodic and forcible intra-frame coding is capable of being reduced. As a result, it is possible to limit the amount of information in such a manner as to prevent the image information avoiding congestion on the transmission networks from being generated, and therefore the cell loss is reduced while at the same time decreasing the image degradation.

In the above-mentioned embodiment, the predetermined past time during which the packet preparation circuit 40 counts cells is set to 1/10 seconds and the control period to regulate the amount of refreshed blocks to 1/30 seconds. Nevertheless, the present invention is not limited to these time lengths, but may be set to a desired time length.

Also, a plurality of threshold levels may be set in the refresh control circuit 36 thereby to control the amount of refreshed blocks in stages. The amount of refreshed blocks is reduced by stage a when the number of cells is larger than a threshold level A, by stage b when the amount of cells is larger than the threshold level B, and by stage c when the amount of cells is larger than the threshold level C, thereby making it possible to reduce the amount of refreshed blocks in three stages of a, b and c.

Further, although FIG. 7 concerns a case in which blocks at adjacent positions are sequentially blocked, a block at any position in a frame may be refreshed as long as the number of blocks is as specified.

I claim:

1. A moving picture coding apparatus comprising means for subjecting an input image to selected one of inter-frame and intra-frame codings, means for generating cells by dividing a code into a predetermined length, means for comparing the amount of cells generated by coding during a predetermined length of past time with a threshold level set in advance, and means for reducing the amount of blocks for periodic and forcible intra-frame coding when the amount of cells is more than the threshold level.

2. A moving picture coding apparatus according to claim 1, further comprising means for deciding the correlationship between an input image and the preceding frame, wherein the inter-frame coding is effected when a correlationship exists, and the intra-frame is carried out when no correlationship exists.

3. A moving picture coding apparatus according to claim 1, wherein the means for generating cells includes means for counting the amount of cells generated during a predetermined period of time.

4. A moving picture coding apparatus according to claim 1, wherein a plurality of threshold levels are set in advance and the blocks are reduced by different numbers for different threshold levels.

* * * * *